United States Patent
Ghosh

(10) Patent No.: US 11,145,855 B2
(45) Date of Patent: Oct. 12, 2021

(54) BAG PLATE ELECTRODES FOR LEAD ACID BATTERY

(71) Applicant: Chittaranjan Ghosh, Parganas (IN)

(72) Inventor: Chittaranjan Ghosh, Parganas (IN)

( * ) Notice: Subject to any disclaimer, the term of this patent is extended or adjusted under 35 U.S.C. 154(b) by 16 days.

(21) Appl. No.: 16/699,865

(22) Filed: Dec. 2, 2019

(65) Prior Publication Data
US 2020/0365876 A1 Nov. 19, 2020

(30) Foreign Application Priority Data
May 17, 2019 (IN) .............................. 201931019694

(51) Int. Cl.
| H01M 4/00 | (2006.01) |
| H01M 4/22 | (2006.01) |
| H01M 4/57 | (2006.01) |
| H01M 4/02 | (2006.01) |

(52) U.S. Cl.
CPC .............. H01M 4/22 (2013.01); H01M 4/57 (2013.01); *H01M 2004/027* (2013.01); *H01M 2004/028* (2013.01)

(58) Field of Classification Search
CPC ............ H01M 4/76; H01M 4/22; H01M 4/57; H01M 2004/028; H01M 4/14; Y02E 60/10
See application file for complete search history.

(56) References Cited

U.S. PATENT DOCUMENTS

| 6,346,347 B1 * | 2/2002 | McNally ............... H01M 4/627 429/215 |
| 6,475,665 B1 * | 11/2002 | Okamoto ............ H01M 50/463 429/139 |
| 2016/0240828 A1 * | 8/2016 | Ueda ................. H01M 10/0585 |

FOREIGN PATENT DOCUMENTS

CN 203707254 * 7/2014 ............. H01M 4/73

* cited by examiner

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

A novel pair of lead acid battery electrodes are proposed, which are bagged in terelyne cloth bag without having used any pasting to avoid paste mixer, pasting machine and oven etc. By increasing active material ratio to structural material, higher energy density is achieved. Uses of bag system for both negative and positive plate protect the plates from shredding of active materials on use of battery with lesser chance of failure.

9 Claims, 1 Drawing Sheet

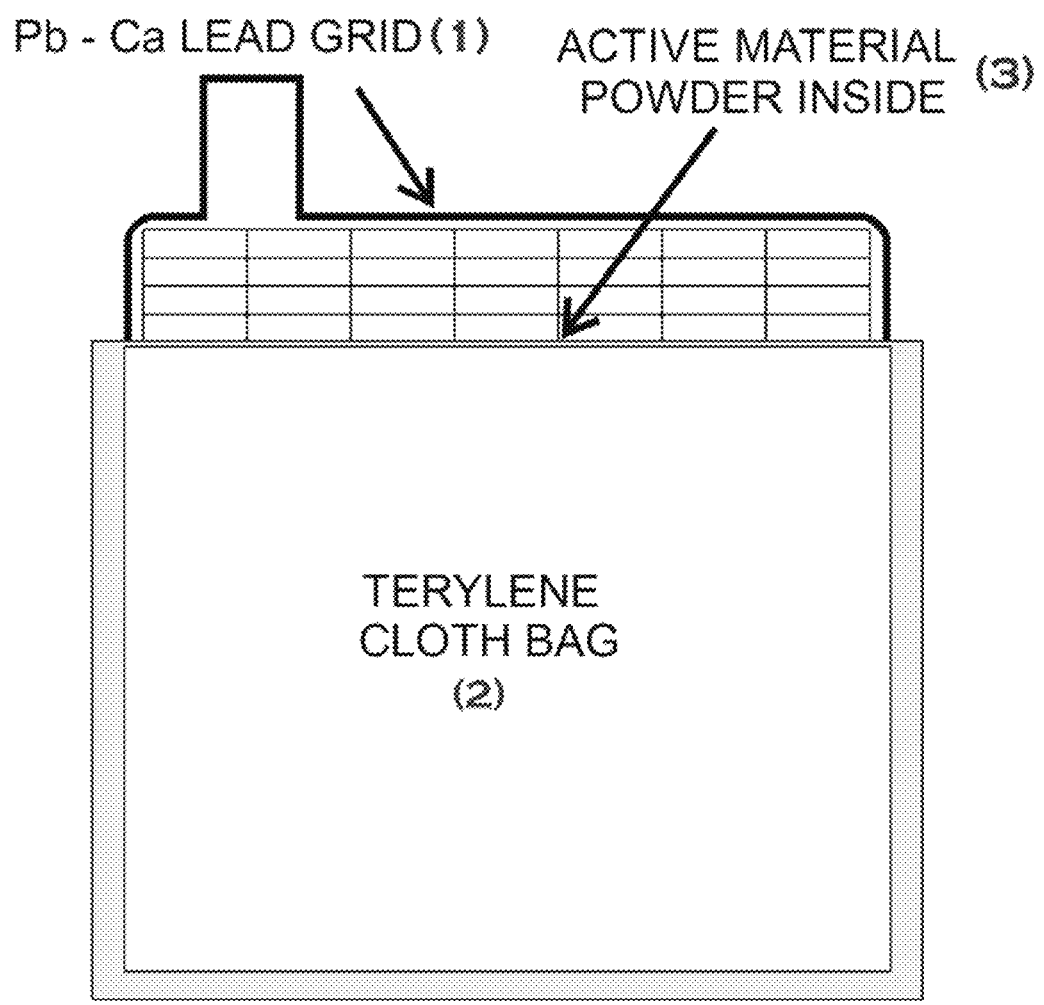

BAG PLATE ELECTRODES FOR LEAD ACID BATTERY

CROSS-REFERENCE TO RELATED APPLICATION

This application claims the benefit and priority of Indian Application No. 201931019694, filed May 19, 2019. The entire disclosure of the above application is incorporated herein by reference.

FIELD

The disclosure relates to a novel pair of electrodes comprising, cathode and anode, enveloped in terelyne cloth bag, filled with lead oxide powder for lead acid batteries.

BACKGROUND

Presently there are three types of electrodes available in the market, which are generally used in lead acid batteries, namely;
 a) Flat pasted positive and negative plate
 b) Tubular positive and flat pasted negative plate
 c) Plante positive and flat pasted negative plate The average energy density, which can be utilized for the available batteries now, is 60 Wh per Kg of lead.

SUMMARY

The proposed pair of electrodes has set target to achieve energy density up to 30% higher, which envisages more efficient use of lead, compact design and lesser number of production process steps.

Both negative and positive plates are protected from shredding.

Further areas of applicability will become apparent from the description provided herein. The description and specific examples in this summary are intended for purposes of illustration only and are not intended to limit the scope of the present disclosure.

DRAWINGS

The drawing described herein is for illustrative purposes only of selected embodiments and not all possible implementations, and is not intended to limit the scope of the present disclosure.

FIG. 1 shows an assembly-in-progress of electrode having Pb—Ca lead grid inserted into the terylene cloth bag, filled with lead oxide powder, to be sealed with LDP glue.

DETAILED DESCRIPTION

The new electrode plates are manufactured by adding dry lead oxide powder and Pb—Ca grid in a terelyne cloth bag. For a positive plate, active material is $Pb_3O_4+PbO+Pb$ and for a negative plate, active material is $PbO+Pb$ along with expander like $BaSO_4$, Lignin and carbon black. The positive plate, containing free lead, can be converted to PbO by oxidation during charging. The negative plate, containing free lead, will be converted to PbO by a curing process. Thus, while adding sulphuric acid lead sulphate can be obtained.

Conventionally for lead-acid battery manufacturing, following plate combination are known/available a) Flat pasted positive and negative
b) Tubular positive and flat pasted negative
c) Plante positive and flat pasted negative A combination of new positive and negative plates is proposed in the present disclosure, that enhances the capacity of the battery by adjusting the ratio of structural materials to active material. The active material and the plate grid are enveloped in a terylene cloth bag. Exclusively designed of this purpose, the terylene bag prevents the shredding of the active material, thereby increasing the life of the battery. The active material to structural material ratio in the developed plate is 85:15, contrary to the conventional ratio of 60:40 which uses a higher proportion of the structural grid.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pair of bag-plate electrodes comprising, Pb—Ca structure grid and dry active lead oxide powder, the Pb—CA grid and dry active lead oxide power are added into and bagged in a terelyene cloth bag, sealed by Low Density Polythene glue.

2. The electrodes as claimed in claim 1, wherein the active powder for positive plate is $Pb3O4+PbO+Pb$.

3. The electrodes as claimed in claim 1, wherein the active powder for negative plate is $PbO+Pb$ along with $BaSO4$ expander, Lignin and Carbon Black.

4. A method of manufacturing bag-plate electrodes by inserting Pb—Ca structural grid in a terelyene cloth bag, adding dry active lead oxide powder into the bag and sealing the mouth of the bag by LDP glue.

5. The method as claimed in claim 4, wherein a mixture of $Pb3O4$, $PbO$ and $Pb$ as active lead oxide powder are added in to the bag before sealing the mouth of the bag by LDP glue for positive plate electrode.

6. The method as claimed in claim 4, wherein a mixture of PbO, Pb as active lead oxide powder along with $BaSo4$ expander, Lignin and carbon black are added in to the bag before sealing the mouth of the bag by LDP glue for negative plate electrode.

7. The bag-plate electrode as claimed through in claim 1, wherein a ratio of active material to structural material is maintained at 85:15.

8. A pair of bag-plate electrodes comprising:
 Pb—Ca structure grid and dry active lead oxide powder, the Pb—CA grid and dry active lead oxide power are added into and bagged in a terelyene cloth bag, sealed by Low Density Polythene glue; and
 the active powder for a positive plate is $Pb3O4+PbO+Pb$; and
 the active powder for a negative plate is $PbO+Pb$ along with $BaSO4$ expander, Lignin and Carbon Black.

9. The pair of bag plate electrodes of claim 8, wherein a ratio of active material to structural material is maintained at 85:15.

* * * * *